United States Patent [19]

Morita et al.

[11] 4,341,161
[45] Jul. 27, 1982

[54] WORKPIECE HANGER CARRIAGE

[75] Inventors: Toshikatsu Morita, Sayama; Akira Minegishi, Saitama, both of Japan

[73] Assignee: Honda Giken Kogyo Kabushiki Kaisha, Tokyo, Japan

[21] Appl. No.: 147,745

[22] Filed: May 8, 1980

[51] Int. Cl.³ .............................................. B65G 17/32
[52] U.S. Cl. .................................... 105/149; 104/89; 104/172 S; 198/680; 198/687
[58] Field of Search ........ 198/365, 680, 683, 686–687, 198/800, 801, 478; 104/172 S, 89, 94.5; 105/149, 154–155, 148

[56] References Cited

U.S. PATENT DOCUMENTS 3,327,836  6/1967  Burt .................................... 198/365
3,443,526  5/1969  Gee .............................. 104/172 S X Primary Examiner—Robert B. Reeves
Assistant Examiner—Douglas D. Watts
Attorney, Agent, or Firm—Irving M. Weiner; Pamela S. Burt; John L. Shortley

[57] ABSTRACT

A workpiece hanger carriage (10) is movable along a first rail (11) and a pair of second rails (17,18) having portions (14,20) vertically curved toward each other. The carriage (10) includes a first frame (21) having rollers (26) rollingly engageable with the first rail (11), and a second frame (31) pivotally mounted on the first frame (21) and having a pair of rollers (51,52) rollingly engageable with the second rails (17,18). The first and second frames (21,31) are angularly movable relative to each other to maintain the second frame (31) substantially horizontally at all times when they move along the vertically curved portions (14,20) of the first and second rails (11,17,18). A pair of L-shaped arms (42,43) are pivotally mounted on the second frame (31) in laterally spaced relation for supporting a workpiece (W), the arms (42,43) having a pair of rollers (55,56) rollingly engageable with a pair of guide rails (57,58) having vertically curved portions (59). The L-shaped arms (42,43) are pivotally movable away from each other for releasing the workpiece (W) when their rollers (55,56) move along the vertically curved portions (59) of the guide rails (57,58).

10 Claims, 5 Drawing Figures

WORKPIECE HANGER CARRIAGE

BACKGROUND OF THE INVENTION

1. Field of the Invention

The present invention relates to a workpiece conveyor system, and to a workpiece hanger carriage for conveying a relatively large workpiece, such as an automobile, along an assembly line.

2. Description of Relevant Art

FIG. 5 of the accompanying drawings illustrates a conventional workpiece hanger carriage 1 movable along a rail 2 supported by posts 3 suspended from a ceiling. The carriage 1 includes a support frame 4 having rollers 5 rollingly engageable with the rail 2. The carriage 1 also includes a pair of laterally spaced arms 6 (only one shown) pivotally mounted on the frame 4 for supporting and releasing movement. A guide rail 7 is located adjacent to the rail 2 and upwardly curved for guiding a roller 8 to move the arms 6 away from each other for releasing a supported workpiece 9, such as an automobile at the end of an assembly line.

One of the problems with the prior workpiece hanger carriage is that the carriage, and hence the workpiece, are inclined forwardly and downwardly as the carriage moves along a downwardly curved portion of the rail to lower the workpiece for the release thereof, or any assembling operation to be performed thereon. Accordingly, the workpiece becomes positionally unstable on the carriage during such lowering movement.

Furthermore, the support arms of the prior carriage are located in such a position that they interfere with opening of the rear doors of a four-door automobile workpiece, making it difficult to attach various parts or effecting other assembling operations through the rear doors.

In addition, with the conventional arrangement, as many specially designed carriages are necessary as there are different types of automobiles or workpieces.

SUMMARY OF THE INVENTION

The present invention provides a workpiece conveyor system and a workpiece hanger carriage comprising a first frame having rollers rollingly engageable with a first rail, and a second frame pivotally mounted on the first frame and having a pair of rollers rollingly engageable respectively with a pair of second rails. The first and second rails have respective portions vertically curved toward each other. A pair of substantially L-shaped arms are pivotally mounted on the second frame, and laterally spaced from each other for jointly supporting a workpiece. When the first and second frames move along the vertically curved rail portions, the first and second frames are angularly moved with respect to each other for maintaining the second frame substantially horizontal at all times. The arms have respective rollers rollingly engageable with a pair of guide rails, respectively, each having a vertically curved portion. The arms are angularly movable away from each other for the release of the workpiece when their rollers move along the vertically curved portions of the guide rails.

It is an object of the present invention to provide a workpiece hanger carriage for supporting a workpiece substantially horizontally at all times while the carriage moves vertically and along conveyor rails.

Another object of the present invention is to provide a workpiece hanger carriage which can maintain the carried workpiece in a balanced position during vertical movement of the carriage.

Still another object of the present invention is to provide a workpiece hanger carriage which allows increased accessibility to the carried workpiece, with resulting easy and reliable operation on the workpiece.

Still another object of the present invention is to provide a workpiece hanger carriage which can carry a wide variety of types of workpieces.

Still another object of the present invention is to provide a workpiece hanger carriage which is relatively simple in structure.

Still another object of the present invention is to provide a workpiece conveyor system for an assembly line, which can convey workpieces with positional stability and which allows the workers to have increased accessibility to the workpieces during horizontal and vertical movement of workpiece carriages.

The above and other objects, features and advantages of the present invention will become apparent from the following detailed description when taken in conjunction with the accompanying drawings which illustrate a preferred embodiment by way of example.

DETAILED DESCRIPTION

Figure 1:
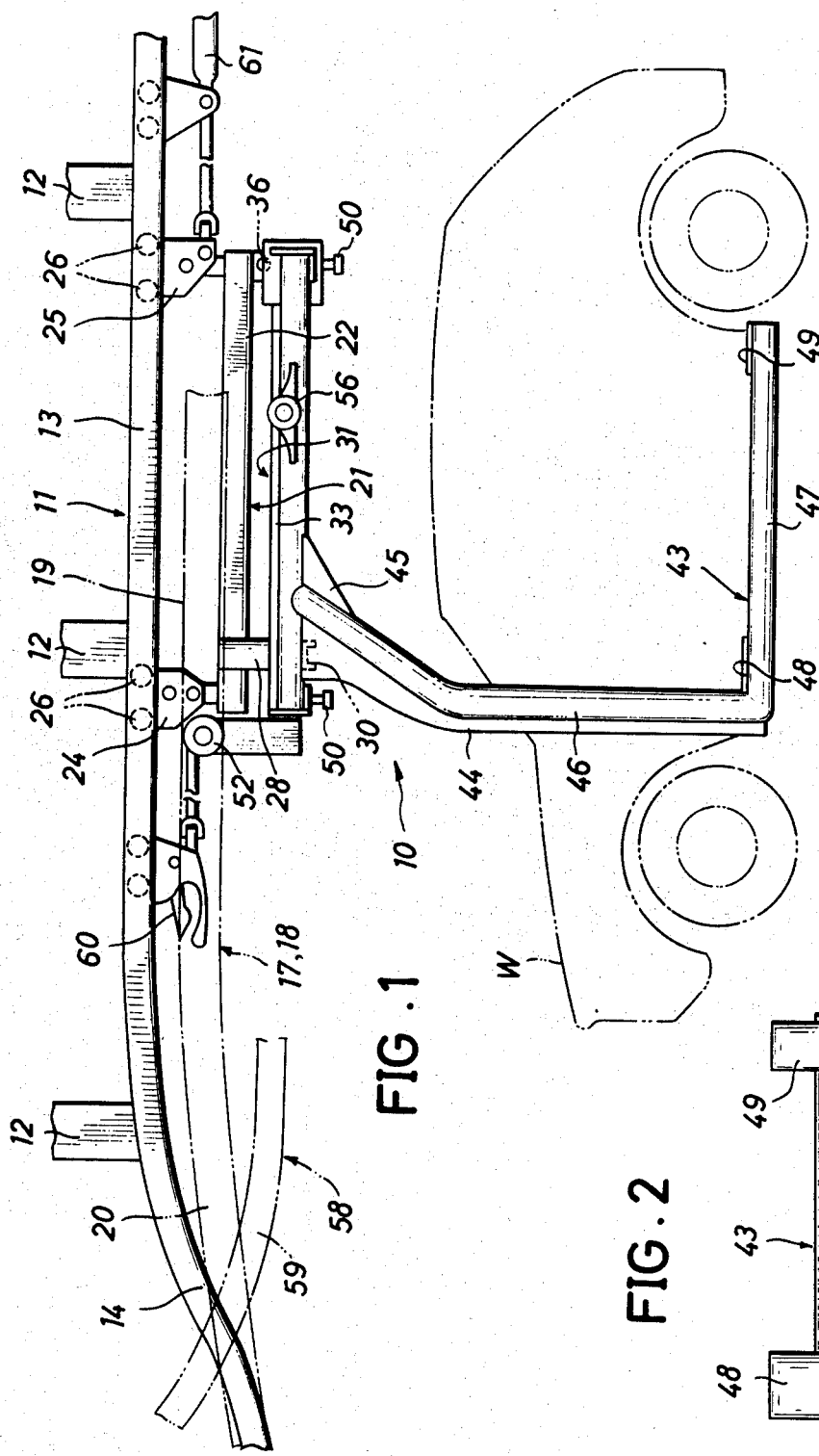
FIG. 1 is a side elevational view of a workpiece hanger carriage according to the present invention.
Figure 3:
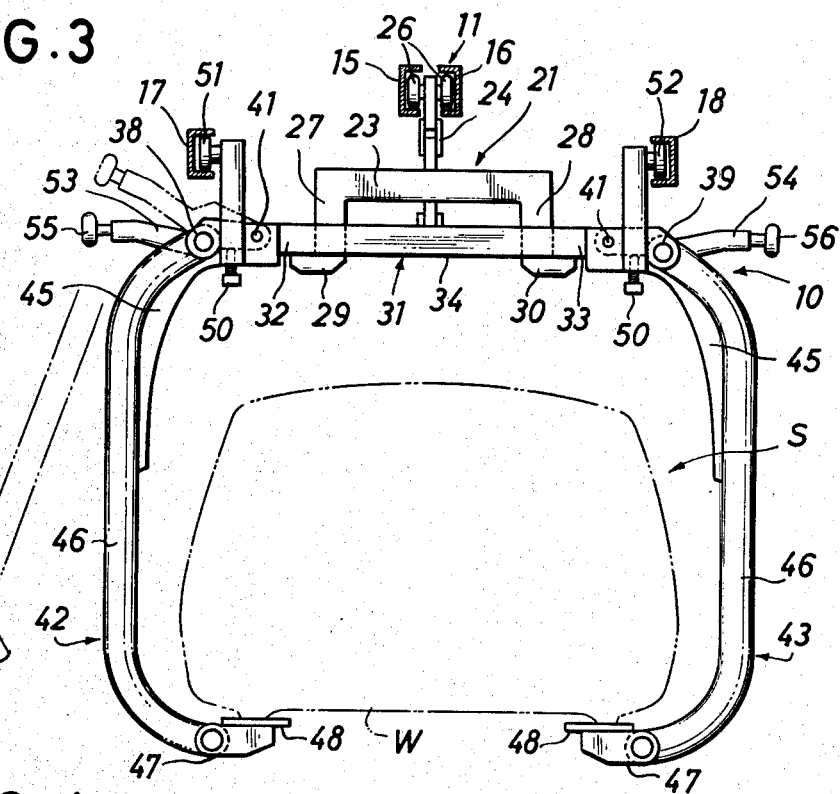
FIG. 3 is a front elevational view of the workpiece hanger carriage.

As shown in FIG. 1, a workpiece hanger carriage 10 of the present invention for conveying a relatively large workpiece W, such as an automobile along an assembly line, is movable along a first rail 11 supported by a plurality of posts 12 projecting downwardly from a ceiling (not shown). The rail 11 includes a substantially horizontal portion 13 and a vertically curved or lowered portion 14 extending from the horizontal portion 13. As illustrated in FIG. 3, the first rail 11 comprises a pair of laterally spaced channels 15 and 16 opening toward each other.

A pair of second laterally spaced rails 17 and 18 are disposed below the first rail 11, and are in the form of channels opening toward each other and located one on each side of the first rail 11. Each of the second rails 17 and 18 includes a substantially horizontal portion 19 and a vertically curved or lowered portion 20 extending from the horizontal portion 19. The curved portion 14 of the first rail 11 is steeper than and extends progressively closer to the curved portion 20 as illustrated in the side elevational view of FIG. 1.

The workpiece hanger carriage 10 comprises a first T-shaped frame 21 (FIG. 4) including a longitudinal member 22 and a transverse member 23. A pair of upstanding brackets 24 and 25 are mounted on the ends of the member 22, and each support rollers 26 rollingly engaging the channels 15 and 16 of the first rail 11, as shown in FIG. 1. The transverse member 23 includes a pair of vertical legs 27 and 28 (FIG. 3) having a pair of horizontal seats 29 and 30, respectively.

Figure 4:
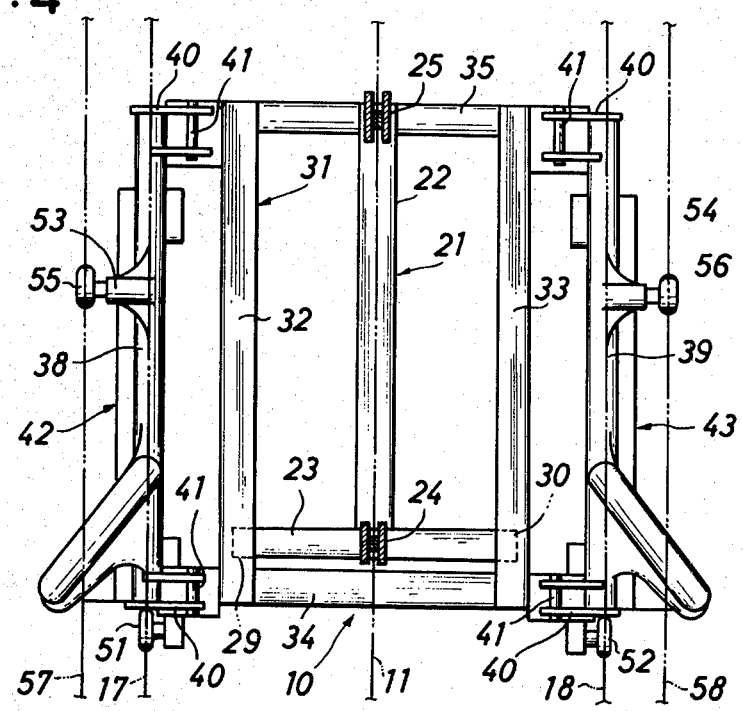
FIG. 4 is a plan view of the workpiece hanger carriage.
Figure 5:
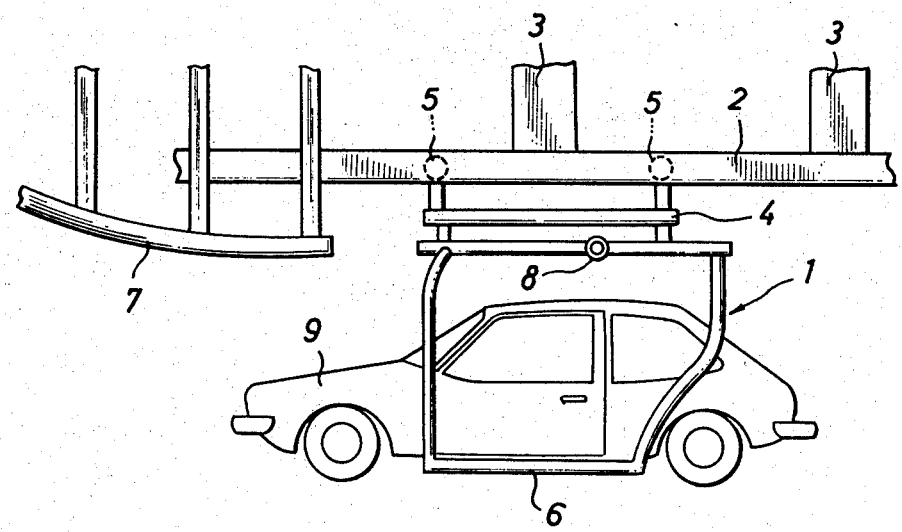
FIG. 5 is a side elevational view of a conventional workpiece hanger carriage.

A second frame 31 of a rectangular configuration is composed of a pair of longitudinal spaced members 32 and 33 and a pair of transverse front and rear members 34 and 35 spaced from each other, and connected endwise to the longitudinal members 32 and 33 as best shown in FIG. 4. The second frame 31 is pivotally mounted at its rear member 35 on the first frame 21 by a pivot pin 36 (FIG. 1), thereby allowing the first and second frames 21 and 31 to angularly move relative to each other about the pin 36. The longitudinal members 32 and 33 are normally seated on the seats 29 and 30, respectively, of the first frame 21, the members 32 and 33 being disengageable from the seats 29 and 30 when the first and second frames 21 and 31 are angularly moved toward each other.

As best illustrated in FIG. 4, a pair of parallel rods 38 and 39 are pivotally mounted one on each side of the second frame 31 by means of plates 40 and pins 41. A pair of substantially L-shaped arms 42 and 43 are fixed as cantilevers such as by welding to the rods 38 and 39, respectively, and are rigidly attached thereto by reinforcing webs 44 and 45 connected between the arms 42 and 43 and the rods 38 and 39. Each of the L-shaped arms 42 and 43 includes a substantially vertical portion 46 located relatively forwardly and a substantially horizontal portion 47 extending rearwardly from the lower end of the vertical portion 46. The horizontal portions 47 of the arms 42 and 43 extend toward each other as shown in FIG. 3. With such an arrangement, the arms 42 and 43 jointly provide a space S therebetween for accommodating the workpiece W.

Figure 2:
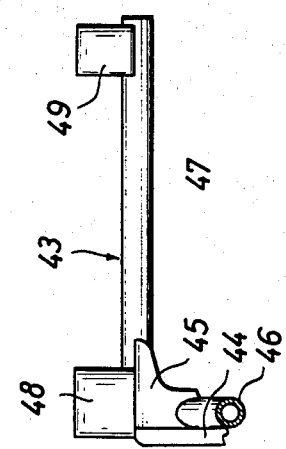
FIG. 2 is a plan view of a portion of a support arm of the workpiece hanger carriage.

In FIG. 2, the horizontal portion 47 is shown as having a pair of longitudinally spaced support plates 48 and 49 for supporting the workpiece W thereon.

The arms 42 and 43 are angularly movable about the pins 41 away from each other toward an outward position, as indicated by the phantom lines at the left side of FIG. 3, for releasing the workpiece W. A plurality of setscrews 50 limit inward movement of the arms 42 and 43.

As better shown in FIGS. 3 and 4, a pair of rollers 51 and 52 are rotatably mounted on the front transverse portion 34 of the second frame 31, and are disposed in rolling engagement with the second rails 17 and 18, respectively. Thus, the second frame 31 is guided for its advancing movement by the second rails 17 and 18.

The rods 38 and 39 include a pair of respective stubs 53 and 54 supporting a pair of rollers 55 and 56, respectively, which rollingly engage a pair of corresponding guide rails 57 and 58 each including a vertically curved or raised portion 59 (FIG. 1).

A pair of connectors 60 and 61 are mounted on the brackets 24 and 25, respectively, for connecting with front and rear workpiece hanger carriages (not shown) in tandem relation.

The workpiece hanger carriage 10 operates as follows. The workpiece hanger carriage 10 carrying the workpiece W with the closed arms 42 and 43 moves along the horizontal portions 13 and 19 of the first and second rails 11, 17 and 18, during which time the longitudinal members 32 and 33 of the second frame 31 rest on the seats 29 and 30 of the first frame 21. Accordingly, the weight of the workpiece W is borne by the rollers 26, and the second frame 31 is maintained substantially horizontally as it travels. The carriage 10 is prevented from laterally wobbling by the rollers 51 and 52 engaging the second rails 17 and 18. During such horizontal advancing movement, various parts may be assembled or installed in the workpiece W.

Because the workpiece W is carried on the cantilevered arms 42 and 43 increased accessibility to the workpiece W for attachment of parts or other assembling operations is achieved. Should the workpiece W be an automobile, the cantilevered arms 42 and 43 allow easy opening and closing of the doors of the automobile, either two, three, four, or five doors, thereby speeding up the assembling operation. The carriage 10 is thus suitable for use with a wide variety of types of automobiles or workpieces.

As the carriage 10 is advanced further, the first frame 21 starts being inclined downwardly and forwardly because all of the rollers 26 thereon engage the first rail 11 and move into the curved portion 14 thereof. The rollers 51 and 52 on the second frame 31 start moving into the curved portions 20 of the second rails 17 and 18. Because the curved portions 20 are not as steep as the curved portion 14, the first frame 21 is angularly moved toward the second frame 31, whereupon the seats 29 and 30 of the first frame 21 are lowered out of engagement with the longitudinal members 32 and 33 of the second frame 31. The second frame 31, and hence the workpiece W, are maintained substantially horizontally in their orientation as the workpiece W is gradually lowered with its weight being borne additionally by the rollers 51 and 52.

Continued advancing movement of the carriage 10 causes the rollers 55 and 56 on the rods 38 and 39 to ride onto the raised portions 59 of the guide rails 57 and 58. The rods 38 and 39 are then pivotally moved about the pins 41 to enable the arms 42 and 43 to be angularly displaced away from each other, thereby releasing the workpiece W from the carriage 10 at the end of the assembly line.

Although a certain preferred embodiment has been shown and described in detail, it should be understood that various changes and modifications may be made therein without departing from the scope of the appended claims.

We claim:

1. A workpiece hanger carriage for moving along a first rail and a second rail which have vertically non-parallel portions relative to each other, comprising:
    a first frame rollingly engageable with said first rail for movement therealong;
    a second frame pivotally mounted on said first frame and rollingly engageable with said second rail for movement therealong, said first and second frames being angularly movable with respect to each other when moving along said non-parallel portions of said first and second rails, respectively;
    means on said second frame for releasably supporting a workpiece, said means comprising a pair of substantially L-shaped arms pivotally mounted as cantilevers on said second frame, and laterally spaced from each other for jointly supporting said workpiece therebetween;
    each said L-shaped arm including a horizontal portion;
    said horizontal portions of said L-shaped arms extending rearwardly, and toward each other; and
    each said horizontal portion of said L-shaped arms having a pair of longitudinally spaced support plates for carrying said workpiece thereon.

2. A workpiece hanger carriage according to claim 1, wherein:

said means further includes a pair of parallel rods fixed to said arms, respectively, and pivotally connected to said second frame.

3. A workpiece hanger carriage for moving along a first rail and a second rail which have vertically non-parallel portions relative to each other, comprising:
  a first frame rollingly engageable with said first rail for movement therealong;
  a second frame pivotally mounted on said first frame and rollingly engageable with said second rail for movement therealong, said first and second frames being angularly movable with respect to each other when moving along said non-parallel portions of said first and second rails, respectively;
  means on said second frame for releasably supporting a workpiece, said means comprising a pair of substantially L-shaped arms pivotally mounted as cantilevers on said second frame, and laterally spaced from each other for jointly supporting said workpiece therebetween;
  said means further including a pair of parallel rods fixed to said arms, respectively, and pivotally connected to said second frame; and
  reinforcing webs connected between said arms and said rods.

4. A workpiece hanger carriage according to claim 2, for further moving along a pair of guide rails each having a vertically curved portion, including:
  a pair of rollers rotatably mounted respectively on said rods for rolling engagement with said guide rails, respectively;
  said L-shaped arms being angularly movable away from each other for releasing said workpiece when said rollers on said rods move along said vertically curved portions of said guide rails.

5. A workpiece conveyor system, comprising:
  (a) a first rail having a vertically lowered portion;
  (b) a pair of second rails each having a portion vertically curved toward said vertically lowered portion of said first rail;
  (c) a pair of third rails each having a vertically raised portion adjacent to said vertically lowered portion;
  (d) a first frame having rollers rollingly engaging said first rail;
  (e) a second frame pivotally mounted on said first frame and having a pair of rollers rollingly engaging said second rails, respectively, said first and second frames being angularly movable relative to each other when moving along said vertically lowered and curved portions of said first and second rails;
  (f) a pair of substantially L-shaped arms pivotally mounted on said second frame and laterally spaced from each other for supporting a workpiece therebetween; and
  (g) a pair of rollers rotatably mounted on said arms, respectively, and rollingly engaging said third rails, respectively, said L-shaped arms being angularly movable away from each other for releasing said workpiece when said rollers on the arms move along said vertically raised portions of said third rails.

6. A workpiece hanger carriage according to claim 5, wherein:
  each said L-shaped arm further includes a vertical portion disposed relatively forwardly, from the lower end of which said horizontal portion is extended, so as to permit facilitated opening and closing of doors of an automobile comprising said workpiece.

7. A workpiece conveyor system according to claim 5, wherein:
  each said L-shaped arm includes a horizontal portion;
  said horizontal portion of said L-shaped arms extend rearwardly, and toward each other; and
  each said horizontal portion of said L-shaped arms has a pair of longitudinally spaced support plates for carrying said workpiece thereon.

8. A workpiece conveyor system according to claim 5, wherein:
  a pair of parallel rods are fixed to said arms, respectively, and pivotally connected to said second frame; and
  reinforcing webs are connected between said arms and said rods.

9. A workpiece hanger carriage according to claim 1 or 3, wherein:
  said first frame comprises an elongated first frame member and a pair of rollers rotatably mounted on the ends of said elongated frame member for rolling engagement with said first rail; and
  said second frame comprises an elongated second frame member pivotally mounted at one end on said first frame member, and having a roller rotatably mounted on the other end of said second frame member for rolling engagement with said second rail.

10. A workpiece hanger carriage according to claim 9, wherein:
  said first frame includes a transverse frame member located remotely from said roller mounted on said second frame member, said transverse frame member normally operably cooperating with said second frame member, while said workpiece hanger carriage is moving along portions of said first and second rails other than said non-parallel portions thereof.

* * * * *